(12) United States Patent
Ohshima et al.

(10) Patent No.: US 9,683,374 B2
(45) Date of Patent: Jun. 20, 2017

(54) FLOOR PANEL

(71) Applicant: SENQCIA CORPORATION, Tokyo (JP)

(72) Inventors: Takashi Ohshima, Saitama (JP); Atsuhiko Kobayashi, Tokyo (JP); Tsukasa Matsuzaki, Saitama (JP); Yuichi Nakabo, Saitama (JP)

(73) Assignee: SENQCIA CORPORATION (JP)

( * ) Notice: Subject to any disclaimer, the term of this patent is extended or adjusted under 35 U.S.C. 154(b) by 0 days.

(21) Appl. No.: 14/346,337

(22) PCT Filed: Sep. 18, 2013

(86) PCT No.: PCT/JP2013/075142
§ 371 (c)(1),
(2) Date: Mar. 21, 2014

(87) PCT Pub. No.: WO2015/040693
PCT Pub. Date: Mar. 26, 2015

(65) Prior Publication Data
US 2016/0237698 A1 Aug. 18, 2016

(51) Int. Cl.
*E04F 15/024* (2006.01)
*E04F 15/06* (2006.01)
(Continued)

(52) U.S. Cl.
CPC ........ *E04F 15/02405* (2013.01); *E04B 5/023* (2013.01); *E04F 15/0247* (2013.01);
(Continued)

(58) Field of Classification Search
USPC .......................................... 52/126.6, 792.152
See application file for complete search history.

(56) References Cited

U.S. PATENT DOCUMENTS 3,001,614 A * 9/1961 Shane ..................... E04C 2/384
228/139
3,992,839 A * 11/1976 La Borde ................ E04B 2/721
52/275

(Continued)

FOREIGN PATENT DOCUMENTS

| JP | H1150645 A | 2/1999 |
| JP | 2009144378 A | 7/2009 |
| JP | 2012132170 A * | 7/2012 |

*Primary Examiner* — Brian Glessner
*Assistant Examiner* — Adam Barlow
(74) *Attorney, Agent, or Firm* — Bacon & Thomas, PLLC

(57) ABSTRACT

The invention provides a floor panel which can reduce a material cost and achieve a weight saving, by easily carrying out a press drawing process. In a floor panel in which an upper member and a lower member are joined in their peripheral edge portions and an internal space is formed in an inner portion of the floor panel, an opening portion intruding approximately as a rectangular shape into an inner side of the floor panel is formed in a side plate portion of each of the upper member and the lower member, and a shape of the opening portion is formed as such a curved shape that two internal corner portions intrude into the inner side of the floor panel than the other approximately linear portions than the internal corner portions, in a whole or a part of a horizontal cross section.

8 Claims, 15 Drawing Sheets

(51) Int. Cl.
*E04B 5/02* (2006.01)
*H02G 3/38* (2006.01)
*H02G 3/18* (2006.01)

(52) U.S. Cl.
CPC .. *E04F 15/02423* (2013.01); *E04F 15/02464* (2013.01); *E04F 15/06* (2013.01); *H02G 3/185* (2013.01); *H02G 3/38* (2013.01)

(56) References Cited

U.S. PATENT DOCUMENTS

| | | | | |
|---|---|---|---|---|
| 4,850,163 | A | * | 7/1989 | Kobayashi ........ E04F 15/02405 52/126.6 |
| 5,533,312 | A | * | 7/1996 | Mihalcheon ............ E04C 2/292 52/309.9 |
| 6,418,697 | B1 | * | 7/2002 | Da Molin ......... E04F 15/02423 52/263 |

* cited by examiner

FLOOR PANEL

BACKGROUND OF THE INVENTION

Field of the Invention

The present invention relates to a floor panel which is used in a free access floor.

Description of the Conventional Art

The floor panel according to the present invention is used in the free access floor. The floor panel of the free access floor is provided above a foundation floor surface which is formed by a concrete material and constructs a part of a building construction, so as to be spaced (refer, for example, to patent document 1).

FIGS. 10 to 15 are views which are referred for describing a conventional floor panel 2. The conventional floor panel 2 constructs a free access floor 1 together with a support leg 4 which is provided in a rising manner on a foundation floor surface 3, as shown in FIG. 10.

The floor panel 2 is arranged on a horizontal surface having a height spaced above from the foundation floor surface 3 so as to be adjacent to each other in both vertical and horizontal axial directions as seen from the above, and four corner portions of the floor panel 2 are detachably supported to the support legs 4 which are provided in a rising manner on the foundation floor surface 3.

The floor panel 2 is constructed as shown by FIG. 12, by mainly combining a top plate 6 formed approximately as a plate shape so that an upper surface 6c is formed approximately as a square shape, and a bottom plate 8 formed as a box shape having a bottom surface 8c, vertically so that the upper surface 6c and the bottom surface 8c are opposed, as shown in FIG. 11. The top plate 6 and the bottom plate 8 are both constructed by using a steel plate member.

In the bottom plate 8 of the floor panel 2, as shown in FIG. 13, a side plate portion 8b folded approximately vertically toward an upper side in the drawing is formed from a peripheral edge portion of a bottom plate portion 8a, and a peripheral edge portion 8f folded toward a right side in the drawing is formed in an upper end portion of the side plate portion 8b. Accordingly, the top plate 8 is formed as a box shape having a concave space 8d which is formed in an inner side in a horizontal direction of the side plate portion 8b.

Further, as shown in FIGS. 13 and 14, the peripheral edge portion 8f above the side plate portion 8b of the bottom plate 8 comes into contact with the peripheral edge portion 6f of the top plate 6, and the peripheral edge portion 6f and the peripheral edge portion 8f are joined to each other by welding or caulking.

As mentioned above, the floor panel 2 is formed as a hollow shape having an internal space 10 by integrally connecting the top plate 6 and the bottom plate 8. Further, the internal space 10 is provided with a reinforcing member 12 having a thickness.

Further, as shown in FIG. 11, the floor panel 2 is structured such that an opening portion 2a intruding approximately as a rectangular shape into an inner side is formed in one edge of side edge portions of the approximately square shape. The opening portion 2a is used for attaching a wall socket used for connecting an underfloor wiring to an office automation equipment installed on the floor panel 2, or simply passing the wiring thereto.

Further, as shown in FIGS. 14 and 15, a connection portion 6h and a step receiving surface 6g are formed in three edge portions which construct the opening portion 2a of the floor panel 2 and is formed approximately as a C-shaped form. A vertical cross section of the connection portion 6h is formed as a tapered shape, and the step receiving surface 6g extends horizontally and in a width direction from a lower end portion of the connection portion 6h and has a step in relation to the upper surface 6c. The step receiving surface 6g is formed along three edge portions which construct the opening portion 2a of the floor panel 2 and are formed approximately as the C-shaped form.

Further, three edge portions of a tabular lid member 18 are brought into contact with the step receiving surface 6g of the top plate 6 so as to close the opening portion 2a of the floor panel 2. The tabular lid member 18 is formed so that its upper surface is formed approximately as the same plane shape as the upper surface 6c of the top plate 6, as shown in FIG. 10.

PRIOR ART DOCUMENT

Patent Document

Patent Document 1: Japanese Unexamined Patent Publication No. 2009-144378

SUMMARY OF THE INVENTION

Problem to be Solved by the Invention

However, in the conventional floor panel 2, in the case that the top plate 6 and the bottom plate 8 are formed by a press drawing process while using a steel plate which has a thin thickness and is not provided for drawing process, there is a problem that it is hard to form a shape intruding approximately as a rectangular shape into the inner side of the side edge portions, for example, the opening portion 2a of the floor panel 2.

In other words, in the case that the top plate 6 and the bottom plate 8 are processed by the press drawing, a thickness of the steel plate in inner corner portions 6m and 8m (refer to FIGS. 11 and 15) becomes thinner than the other portions by being drawn, the inner corner portions 6m and 8m being formed so as to be recessed approximately vertically to inner sides thereof. Therefore, the steel plate can not extend sufficiently, and a crack is generated, so that there is a case that the opening portion 2a can not be well molded.

Further, in the case that the steel plate does not extend sufficiently and the crack is generated so as to create an opening, in the inner corner portion 6m of the top plate 8 and the inner corner portion 8m of the bottom plate 8, a part of the reinforcing member 12 provided in the internal space 10 of the floor panel 2 is exposed to an external portion of the floor panel 2, and there is a risk that the exposed portion may cause a fire.

Accordingly, since the top plate 6 and the bottom plate 8 can not be processed by the press molding while using the thin steel plate, it is necessary to use a thick steel plate or a steel plate for drawing process. Therefore, there is a problem that a material cost of the floor panel 2 is increased, and the floor panel 2 becomes heavy.

Accordingly, the present invention is made by taking the problem mentioned above into consideration, and an object of the present invention is to provide a floor panel which can reduce a material cost and achieve a weight saving, by easily carrying out a press drawing process which is hard in the case that the thin steel plate is used.

Means for Solving the Problem

In order to achieve the object, according to the present invention, there is provided a floor panel comprising:

an upper member;

a lower member; and an internal space which is formed in an inner portion of the floor panel by connecting peripheral edge portions of the upper member and the lower member, wherein an opening portion intruding approximately as a rectangular shape into an inner side of the floor panel is formed in a side plate portion of each of the upper member and the lower member, and wherein a shape of the opening portion is formed as such a curved shape that two internal corner portions intrude into the inner side of the floor panel than the other approximately linear portions than the internal corner portions, in a whole or a part of a horizontal cross section.

Further, the floor panel according to the present invention further comprises an upper member and a lower member which are formed as a box shape having a concave space, and is structured such that the peripheral edge portions are connected so as to communicate the concave spaces in the upper member and the lower member with each other, and an internal space is formed in the inner portion.

Further, the floor panel according to the present invention is structured such that protruding portions protruding toward a horizontal direction and a center side of the opening from the three edge portions, in a contact portions between a lower surface of the upper member and an upper surface of the lower member, are formed in the opening portions of the upper member and the lower member, and a lower surface of the protruding portion in the upper member and an upper surface of the protruding portion in the lower member are joined to each other.

Further, the floor panel according to the present invention is structured such that a step receiving surface is formed in the upper member so as to be along three edge portions of the opening portion.

Further, the floor panel according to the present invention is structured such that a reinforcing member is provided in the internal space which is formed between the upper member and the lower member.

Effect of the Invention

According to the floor panel of the present invention mentioned above, in the floor panel having the upper member, the lower member, and the internal space which is formed in the inner portion of the floor panel by connecting the peripheral edge portions of the upper member and the lower member, the opening portion intruding approximately as the rectangular shape into the inner side of the floor panel is formed in the side plate portion of each of the upper member and the lower member, and the shape of the opening portion is formed as such the curved shape that two internal corner portions intrude into the inner side of the floor panel than the other approximately linear portions than the internal corner portions, in a whole or a part of a horizontal cross section. Therefore, it is possible to reduce a material cost and achieve a weight saving by easily processing a press drawing which is hard in the case that the thin steel plate is used.

Figure 1:
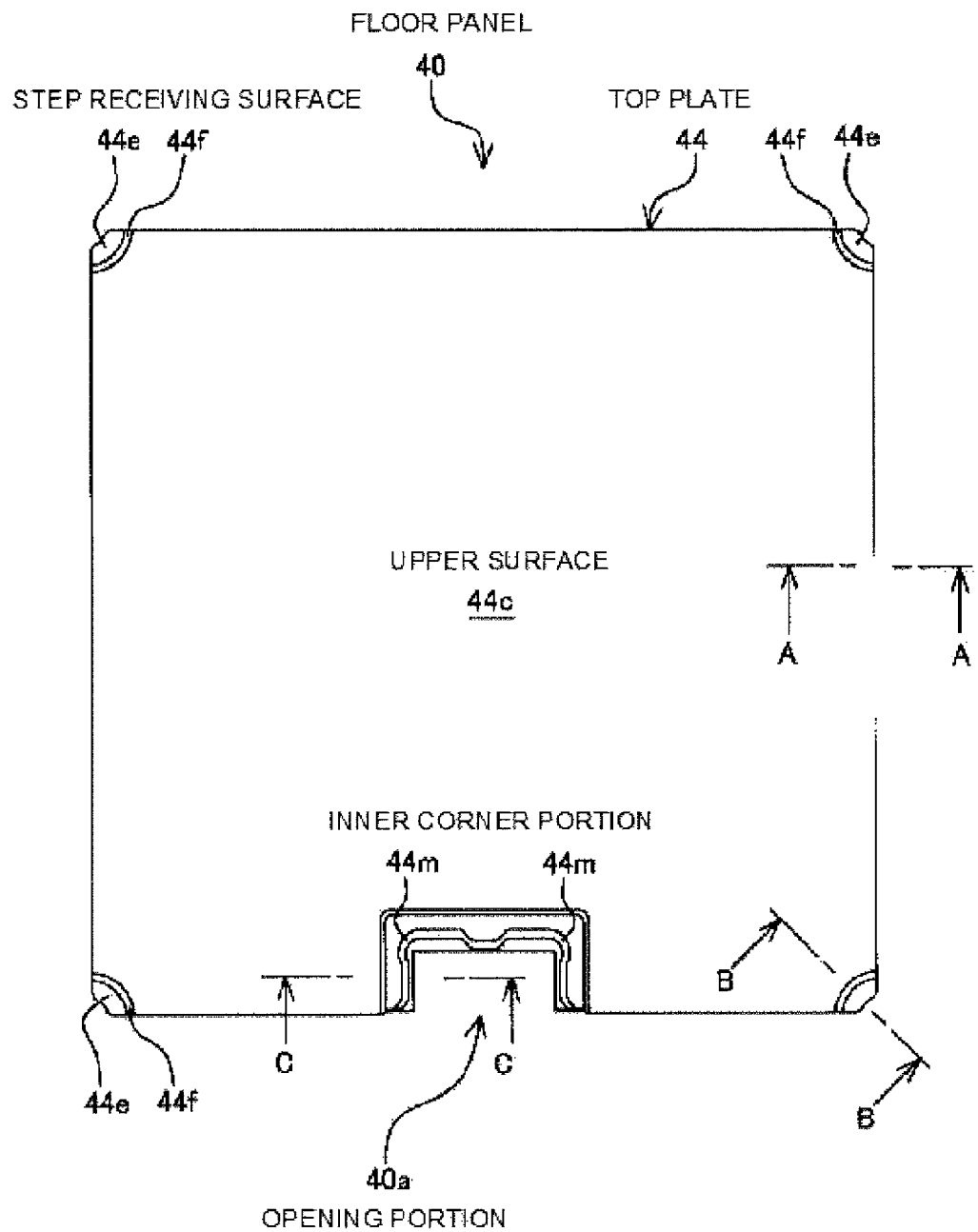
FIG. 1 is a top elevational view of a floor panel 40 according to an embodiment of the present invention.

DESCRIPTION OF REFERENCE NUMERALS 1 free access floor
2 floor panel
2a opening portion
3 foundation floor surface
4 support leg
5 joint portion
6 top plate
6a top plate portion
6c upper surface
6g step receiving surface
6h connection portion
6m inner corner portion
8 bottom plate
8a bottom plate portion
8b side plate portion
8c bottom surface
8d concave space
8e concave portion
8m inner corner portion
10 internal space
12 reinforcing member
15 male thread member
17 flat head bolt
17a flat head portion
17b male thread portion
18 lid member
40 floor panel
40a opening portion
41 free access floor
44 top plate
42 support leg
44a top plate portion
44b side plate portion 44c upper surface
44d concave space
44e step receiving surface
44f connection portion
44g step receiving surface
44h connection portion
44k protruding portion
44m inner corner portion
44n curved portion
44r inclined portion
45 joint portion
46 bottom plate
46a bottom plate portion
46b side plate portion
46c bottom surface
46d concave space
46e concave portion
46k protruding portion
46m inner corner portion
46r inclined portion
50 reinforcing member
56 panel adjusting table
56a support surface
56b female thread hole
58 leg portion
58a male thread portion

DETAILED DESCRIPTION OF PREFERRED EMBODIMENTS

A description will be specifically given below of a mode for carrying out a floor panel according to the present invention with reference to the accompanying drawings.

FIGS. 1 to 9 are views which are referred for describing a floor panel 40 according to an embodiment of the present invention.

Figure 2:
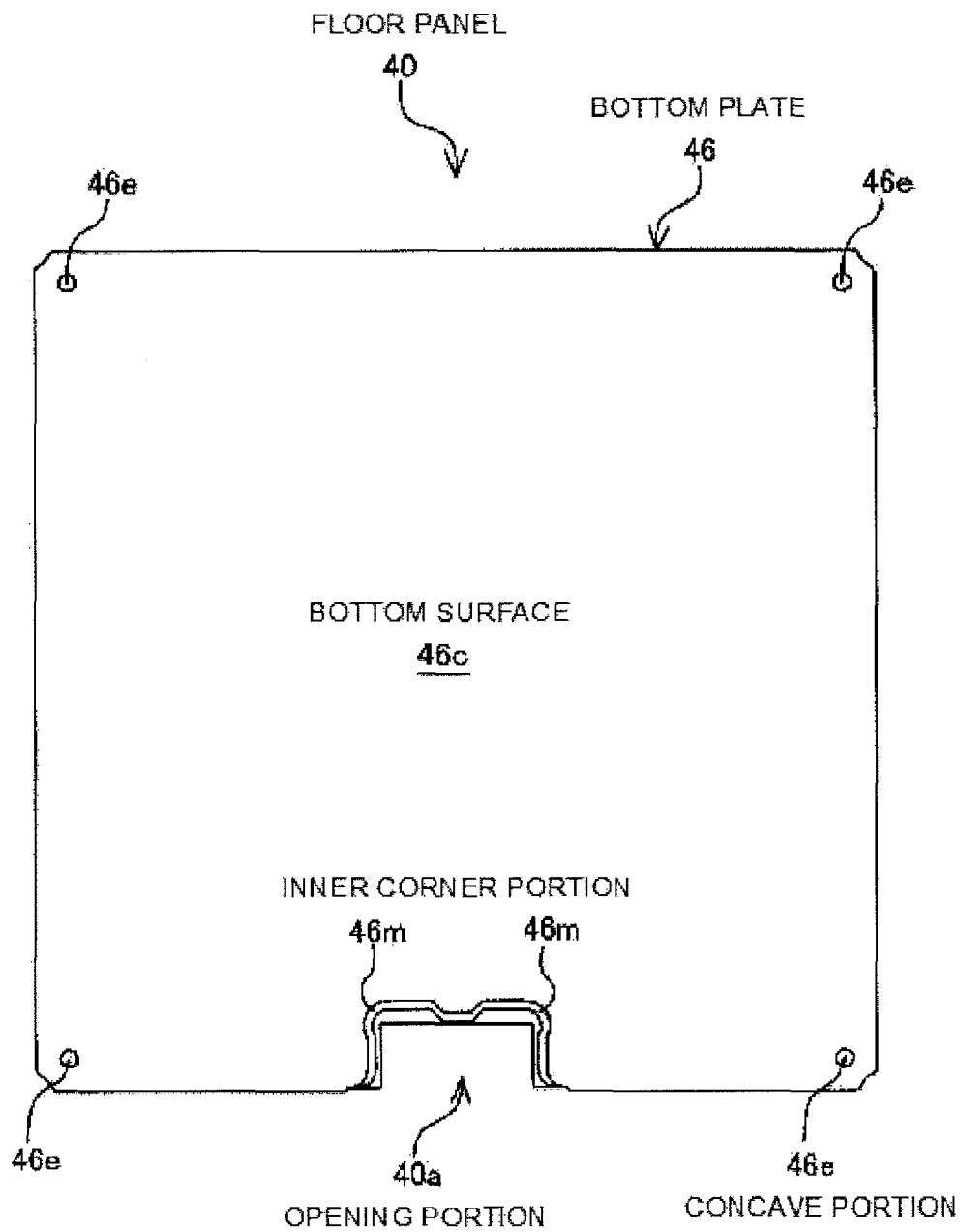
FIG. 2 is a bottom elevational view of the floor panel 40 shown in FIG. 1.
Figure 3:
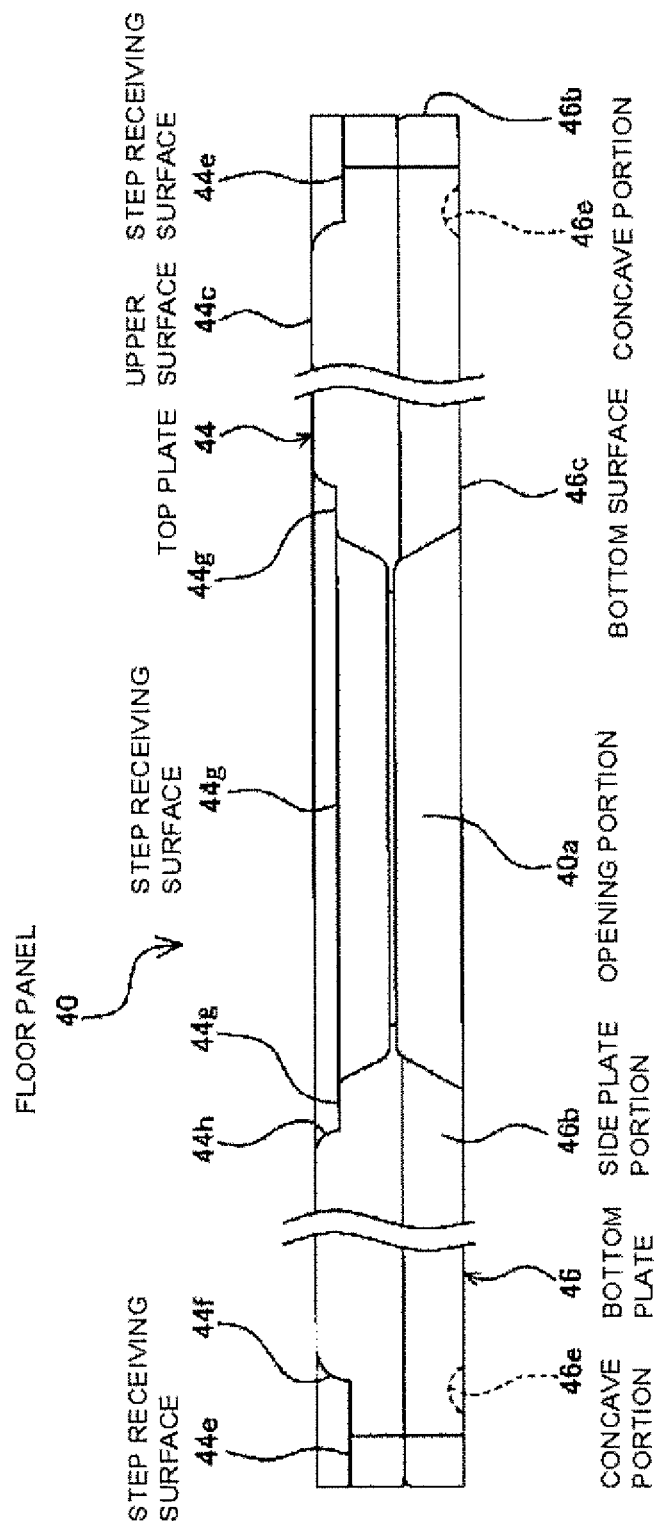
FIG. 3 is a side elevational view showing an outline of the floor panel 40 shown in FIG. 1.

The floor panel 40 according to the present embodiment is constructed as shown in FIG. 3, by combining a top plate 44 (an upper member) and a bottom plate 46 (a lower member) vertically. An upper surface 44c of the top plate 44 is formed approximately as a square shape and a bottom surface 46c of the bottom plate 46 facing to the top plate is formed approximately as a square shape as shown in FIGS. 1 and 2.

The top plate 44 and the bottom plate 46 are formed by a press drawing process, for example, while using a steel plate member such as SGCC.

Figure 4:
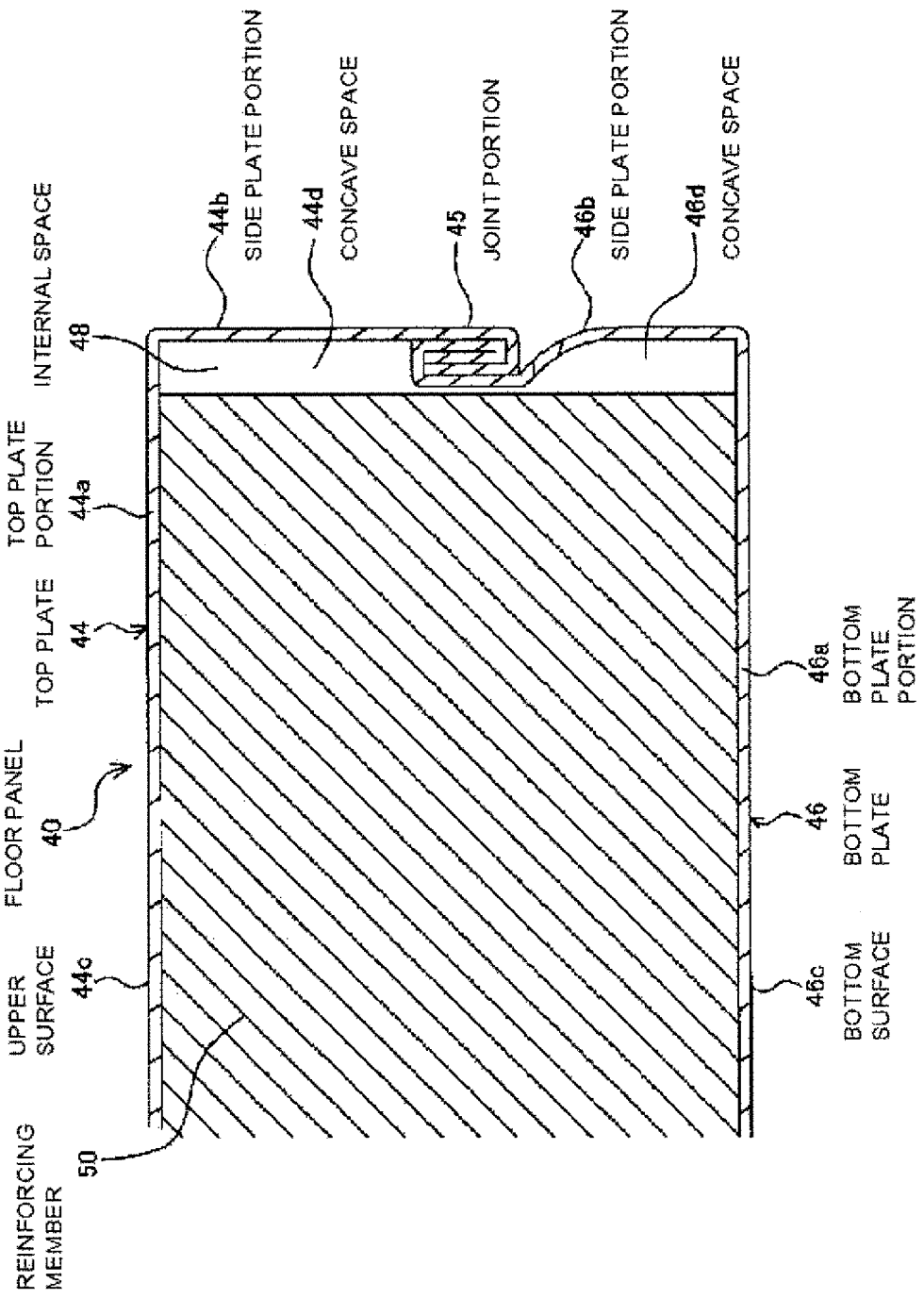
FIG. 4 is a cross sectional view of the floor panel 40 shown in FIG. 1 as seen from an arrow A-A.

A side plate portion 44b is formed in the top plate 44 of the floor panel 40, the side plate portion 44b being folded approximately vertically from a peripheral edge portion of a top plate portion 44a toward a lower side in the drawing, and a side plate portion 46b is formed in the bottom plate 46 of the floor panel 40, the side plate portion 46b being folded approximately vertically from a peripheral edge portion of a bottom plate portion 46a toward an upper side in the drawing, as shown in FIG. 4.

As a result, the top plate 44 is formed as a box shape having a concave space 44d which is formed in an inner side in a horizontal direction of the side plate portion 44b and over a height direction. Further, the bottom plate 46 is also formed as a box shape having a concave space 46d which is formed in an inner side in a horizontal direction of the side plate portion 46b and over a height direction.

Further, the floor panel 40 is arranged so as to communicate the concave spaces 44d and 46d of the top plate 44 and the bottom plate 46 with each other, and a lower end portion of the side plate portion 44b of the top plate 44 and an upper end portion of the side plate portion 46b of the bottom plate 46 are folded as a U-shaped form so as to enwrap respective leading end portions, thereby being joined in a joint portion 45 approximately in a center portion in a vertical direction in FIG. 4 of the floor panel 40.

As mentioned above, since the top plate 44 and the bottom plate 46 are integrally joined in the joint portion 45, the floor panel 40 is formed as a hollow shape having an internal space 48. Further, a reinforcing member 50 having a thickness is housed within the internal space 48 for improving a strength of the floor panel 40.

The joining in the joint portion 45 of the top plate 44 and the bottom plate 46 in the floor panel 40 is carried out by a pressing process after setting the reinforcing member in the concave space 46d of the bottom plate 46 and putting the concave space 44d of the top plate 44 on the reinforcing member 50.

In the top plate 44 of the floor panel 40, connection portions 44f and step receiving surfaces 44e are formed in four corner portions thereof, the connection portion 44f being formed as a circular arc shape obtained by dividing a circle into four pieces in its plane shape, and the step receiving surface 44e being formed as a circular arc shape obtained by dividing a circle into four pieces in its plane shape, in a radially inner side of the connection portion 44f, as shown in FIG. 1.

Figure 5:
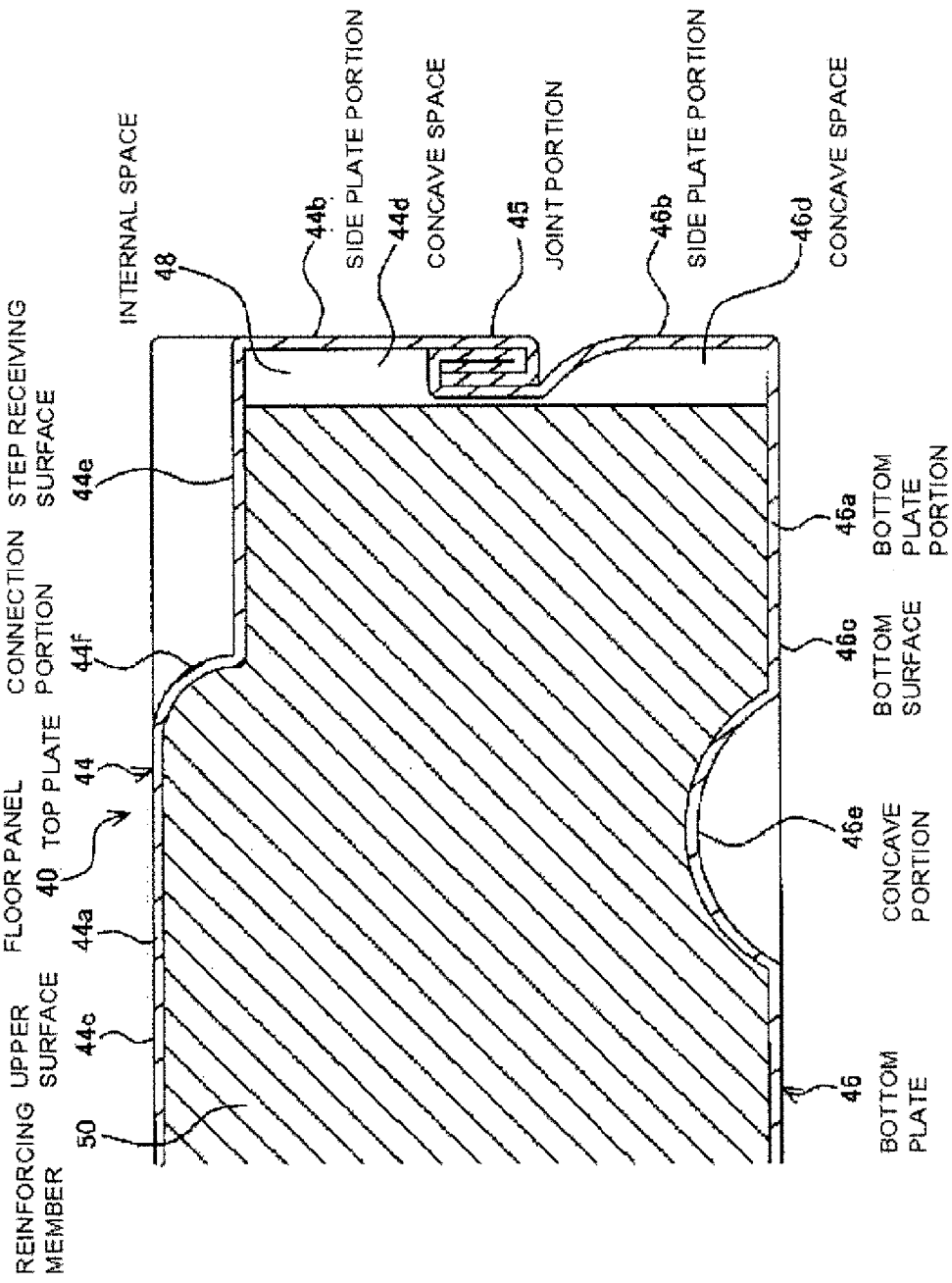
FIG. 5 is a cross sectional view of the floor panel 40 shown in FIG. 1 as seen from an arrow B-B.

In other words, the connection portion 44f formed as the circular arc shape in its vertical cross section is formed in each of four corner portions of the top plate 44, and the step receiving surface 44e having a low step in relation to the upper surface 44c is formed in each of four corner portions of the top plate 44 so as to extend from a lower end portion of the connection portion 44f in a radial direction in parallel to the upper surface 44c of the top plate 44 (horizontally), as shown in FIG. 5.

Further, as shown in FIGS. 1 and 2, an opening portion 40a is formed in the floor panel 40, the opening portion 40a intruding approximately like a rectangular shape into an inner side in a lower edge (a lower side edge extending in a lateral direction of the drawing) which is one of side edge portions of the approximately square shape. The opening portion 40a is used for attaching a wall socket which is used for connecting an underfloor wiring to an office automation equipment installed on the floor panel 40.

Figure 6:
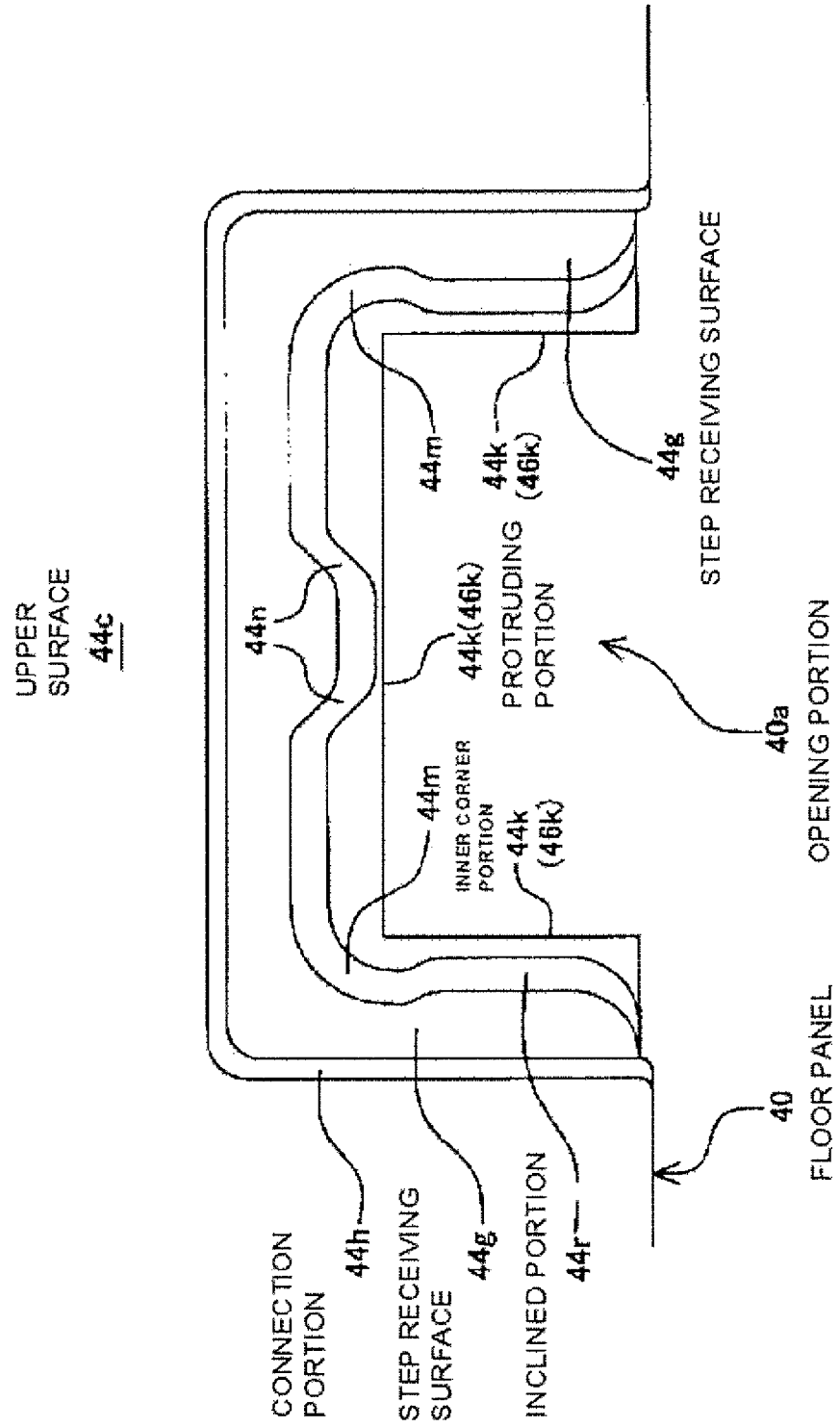
FIG. 6 is a partly enlarged view showing an opening portion 40a of the floor panel 40 shown in FIG. 1 and its periphery in an enlarged manner.
Figure 7:
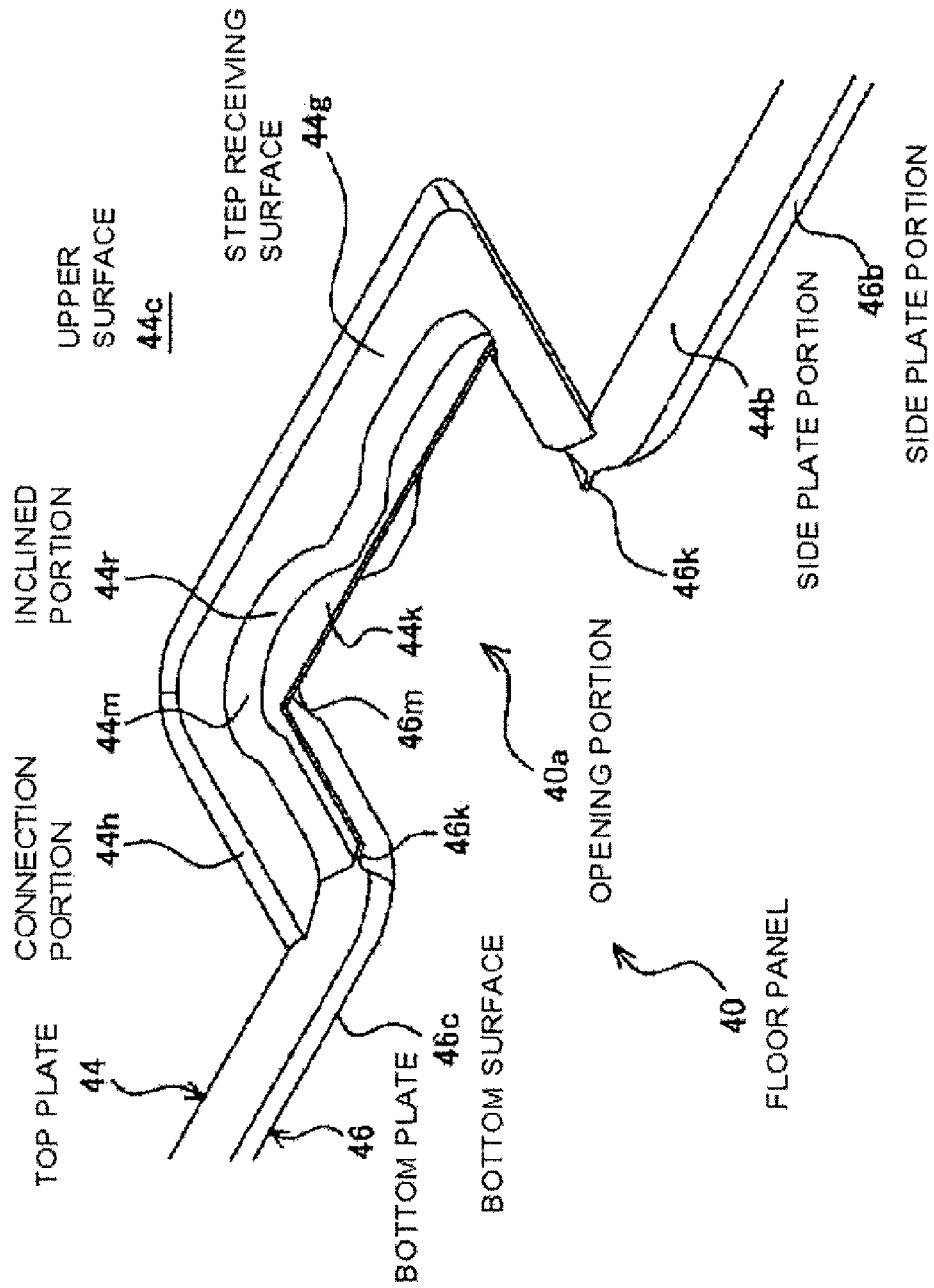
FIG. 7 is a partly enlarged perspective view showing the opening portion 40a of the floor panel 40 shown in FIG. 1 and its periphery in an enlarged manner.
Figure 8:
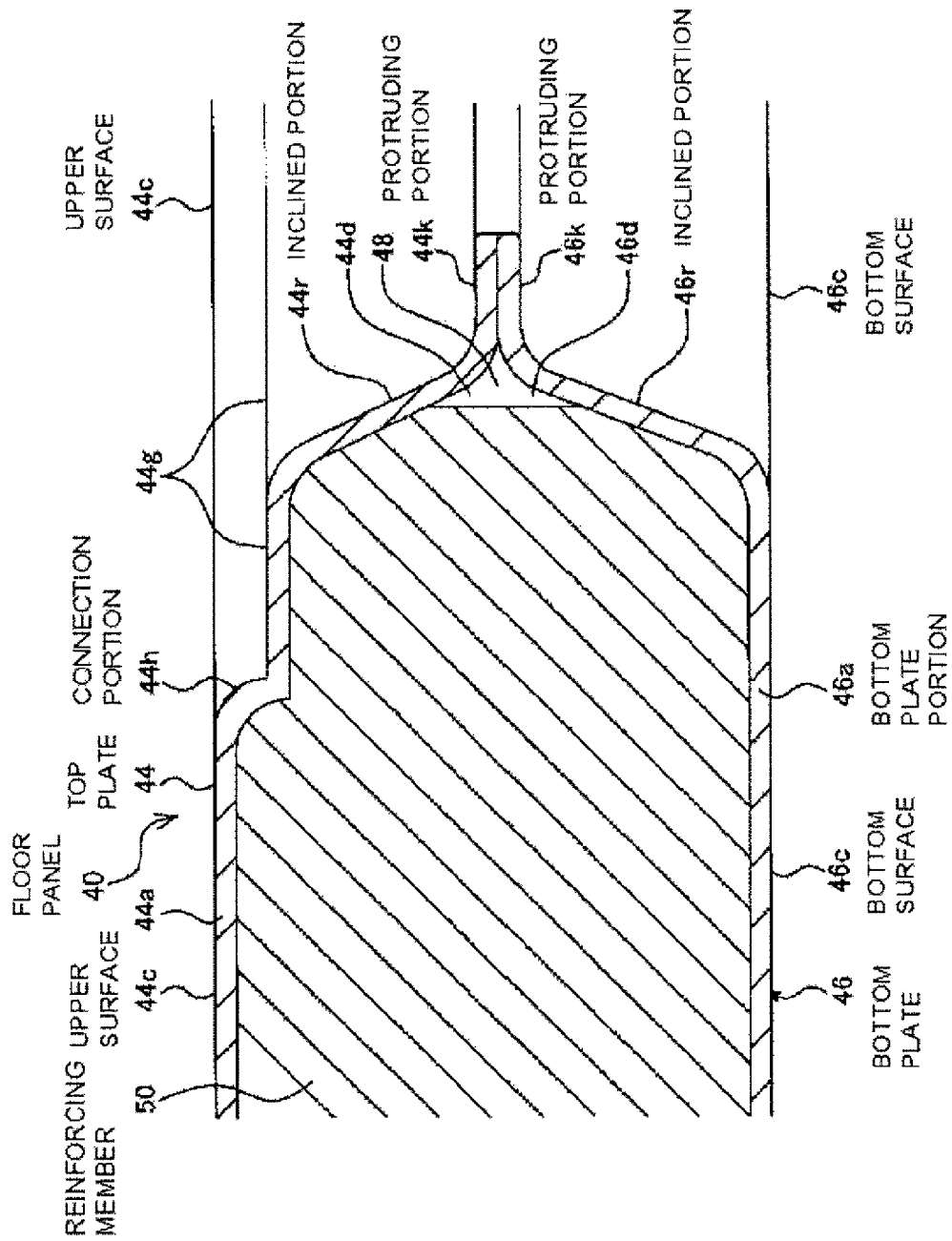
FIG. 8 is a cross sectional view of the floor panel 40 shown in FIG. 1 as seen from an arrow C-C.

Further, as shown in FIGS. 6 to 8, a connection portion 44h and a step receiving surface 44g are formed in three edge portions which construct the opening portion 40a of the floor panel 40 and are formed approximately as a C-shaped form, the connection portion 44h being formed in its vertical cross section as a circular arc shape, and the step receiving surface 44g extending from a lower end portion of the connection portion 44h in parallel to the upper surface 44c of the top plate 44 (horizontally) and in a width direction, and having a low step in relation to the upper surface 44c. The step receiving surface 44g is formed along three edge portions which construct the opening portion 40a of the floor panel 40 and are formed approximately as a C-shaped form.

Figure 10:
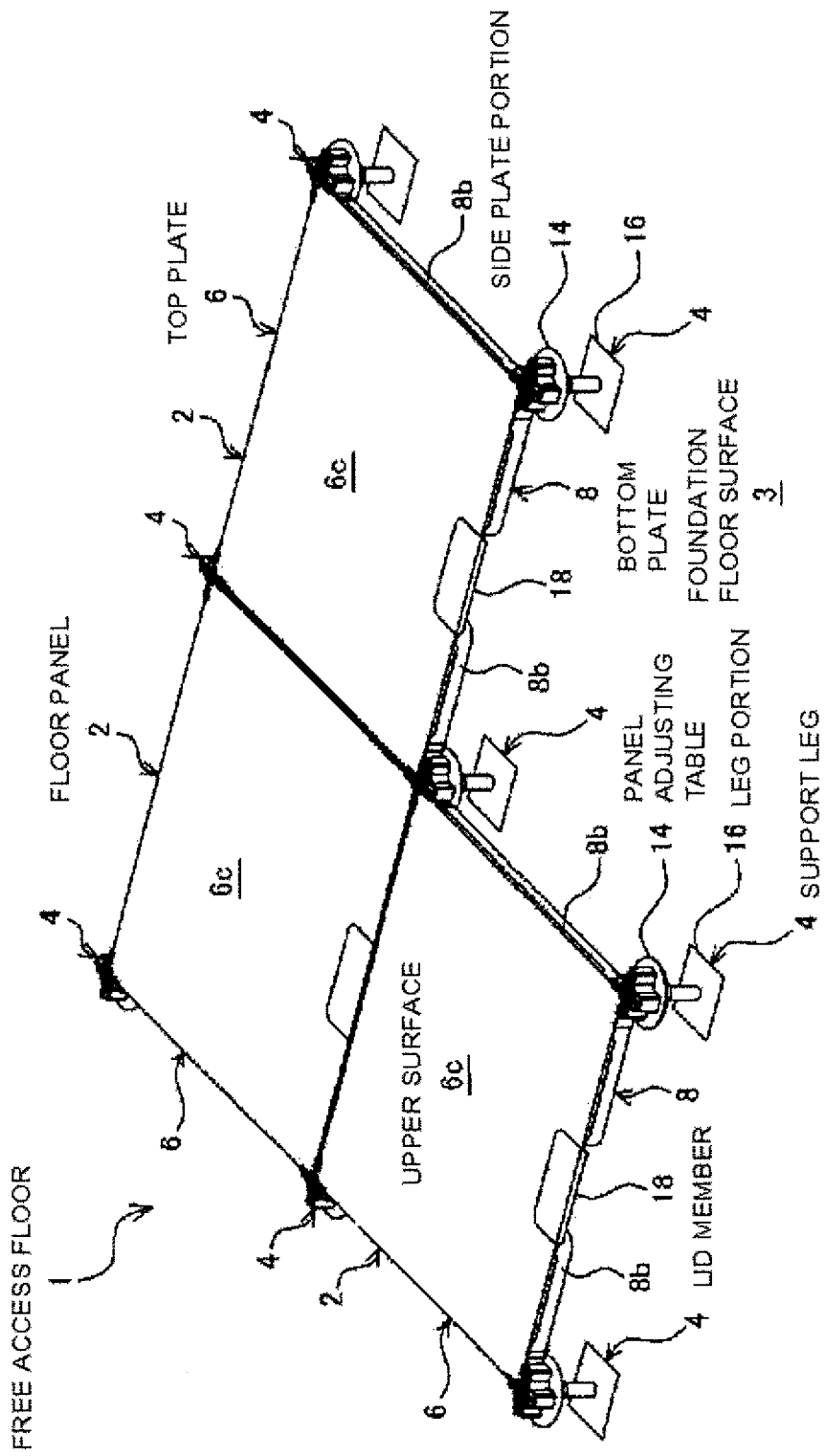
FIG. 10 is a partly perspective view showing a conventional free access floor 1 which is constructed by a conventional floor panel 2, and support legs 4 supporting the floor panel 2.

Further, the opening portion 40a of the floor panel 40 is structured such as to be closed by brining a lower surface of a tabular lid member 18 (refer to FIG. 10) into contact with the step receiving surface 44g of the top plate 44, the lid member 18 being formed so that its upper surface approximately forms the same plane shape as the upper surface 44c of the top plate 44.

Further, an inclined portion 44r and a protruding portion 44k are formed in the top plate 44, the inclined portion 44r being inclined toward a diagonally lower side from the step receiving surface 44g of the top plate 44, and the protruding portion 44k extending in a horizontal direction from a lower end portion of the inclined portion 44r and having a step in relation to the step receiving surface 44g, as shown in FIG. 8. The protruding portion 44k is formed along three edge portions which construct the opening portion 40a of the floor panel 40 shown in FIG. 6 and are formed approximately as the C-shaped form.

Further, an inclined portion 46r and a protruding portion 46k are formed in the bottom plate 46, the inclined portion 46r being inclined toward a diagonally upper side from the bottom surface 46c of the bottom plate 46, and the protruding portion 46k extending in a horizontal direction from an upper end portion of the inclined portion 46r and having a step in relation to the bottom surface 46c, as shown in FIG. 8. The protruding portion 46k is formed along three edge portions which construct the opening portion 40a of the floor panel 40 and are formed approximately as the C-shaped form.

Further, as shown in FIG. 8, a lower surface of the protruding portion 44k of the top plate 44 and an upper surface of the protruding portion 46k of the bottom plate 46 are arranged so as to come into contact with each other, and the protruding portions 44k and 46k are joined therebetween by welding or caulking.

A protruding dimension at which leading ends of the protruding portions 44k and 46k protrude to the center side of the opening portion 40a in a horizontal direction from three edge portions constructing the opening portion 40a is set so that a magnitude of the opening portion 40a of the floor panel 40 comes to a magnitude which can attach the wall socket used for connecting the underfloor wiring to the office automation equipment installed on the floor panel 40.

Further, a horizontal cross sectional shape in the inclined portion 44r of the opening portion 40a is formed as such a curved shape that two inner corner portions (internal corner portions) 44m (refer to FIGS. 6 and 7) intrude into an inner side of the floor panel 40 in comparison with the other approximately linear portions than the inner corner portions 44m.

Figure 11:
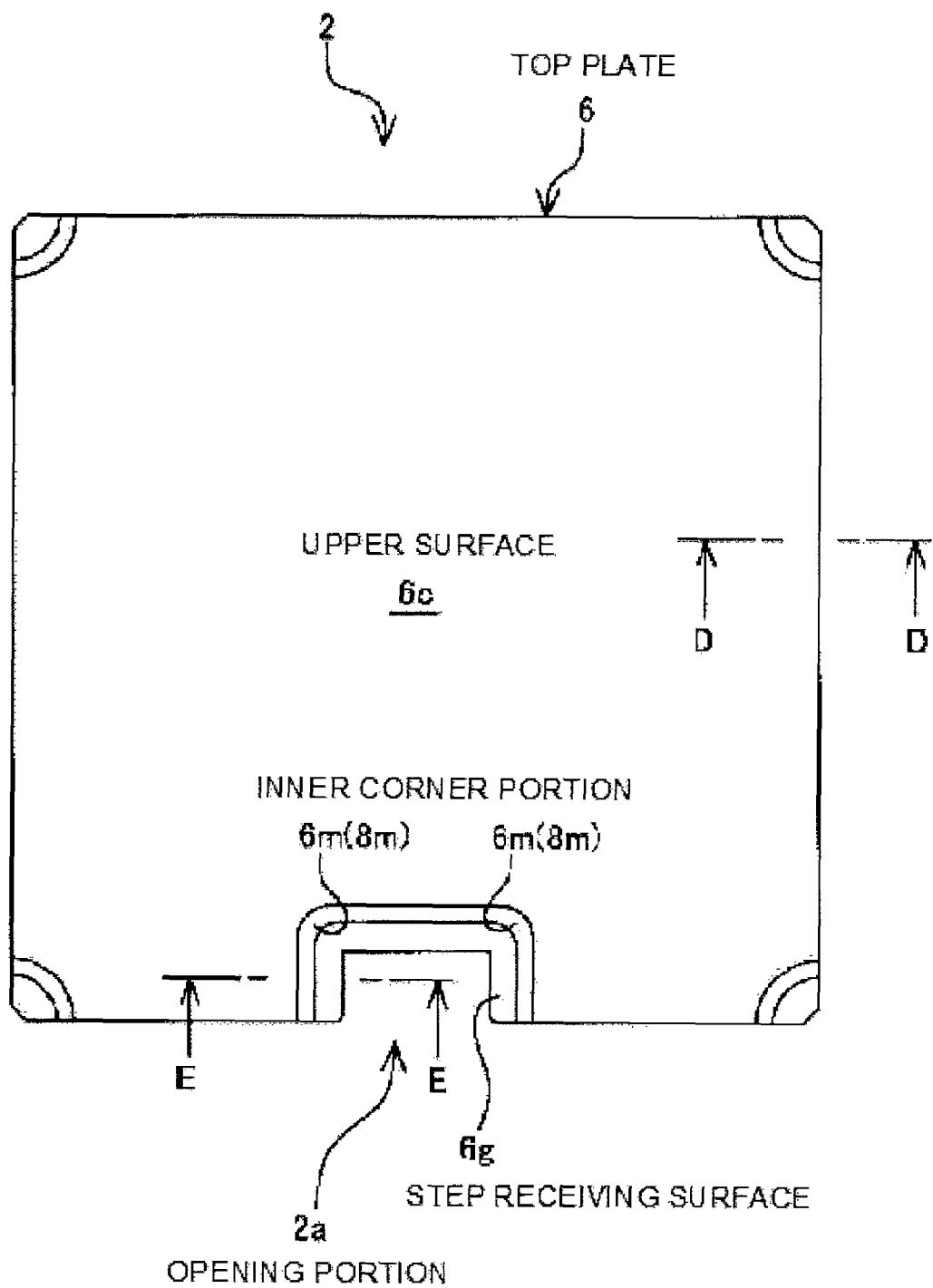
FIG. 11 is a top elevational view of the conventional floor panel 2.
Figure 12:
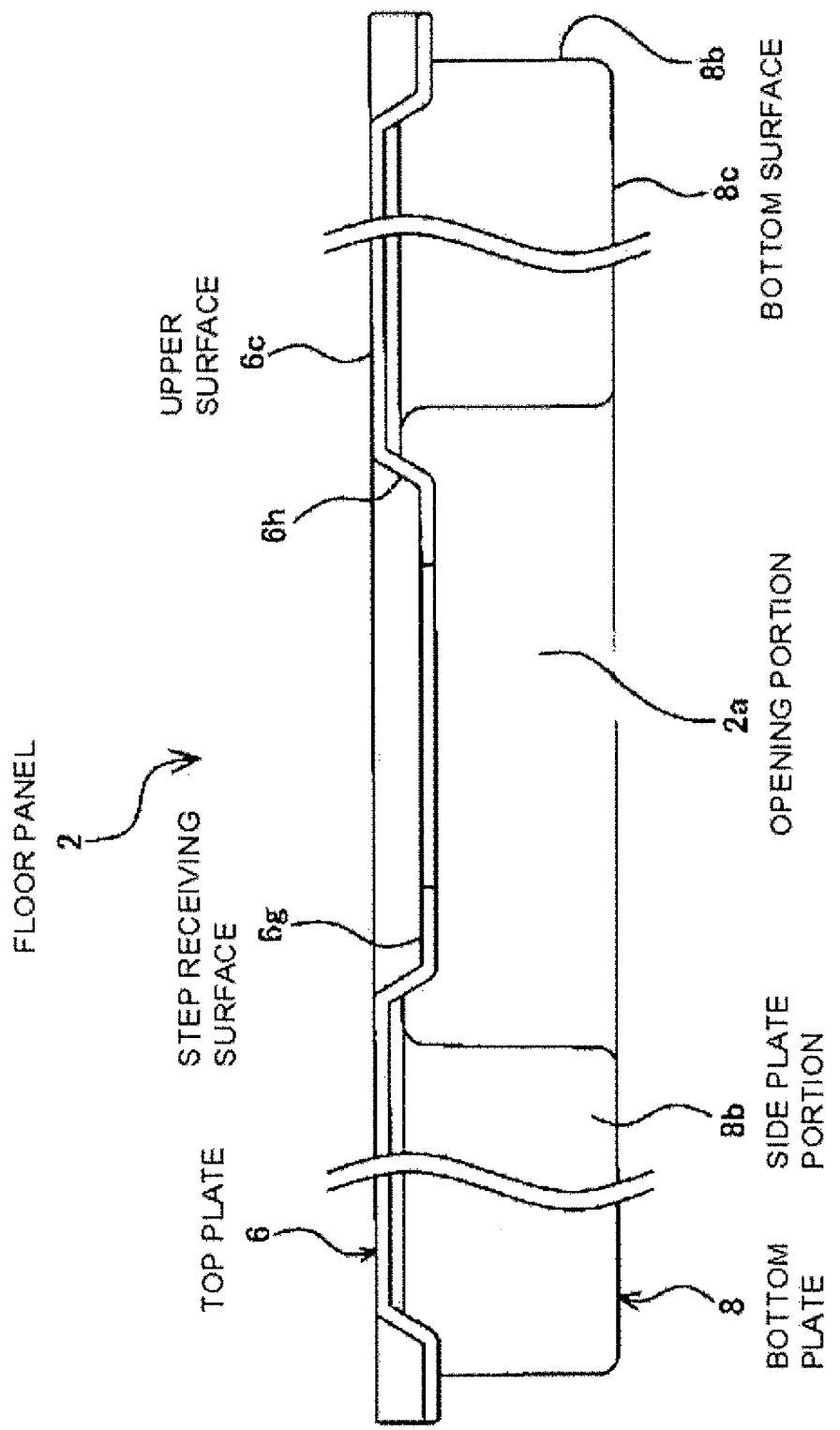
FIG. 12 is a side elevational view showing an outline of the conventional floor panel 2.
Figure 13:
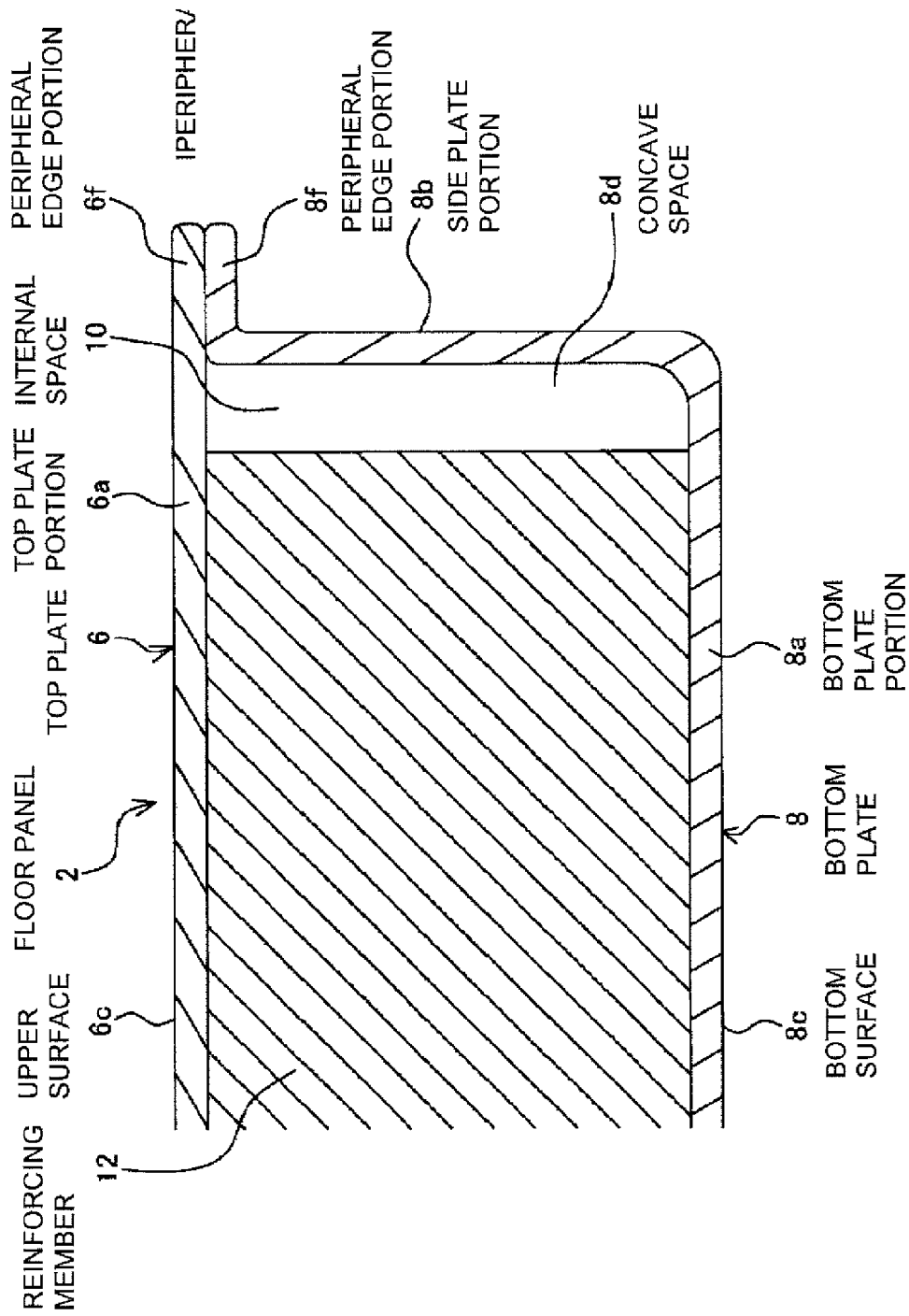
FIG. 13 is a cross sectional view of the floor panel 2 shown in FIG. 11 as seen from an arrow D-D.
Figure 14:
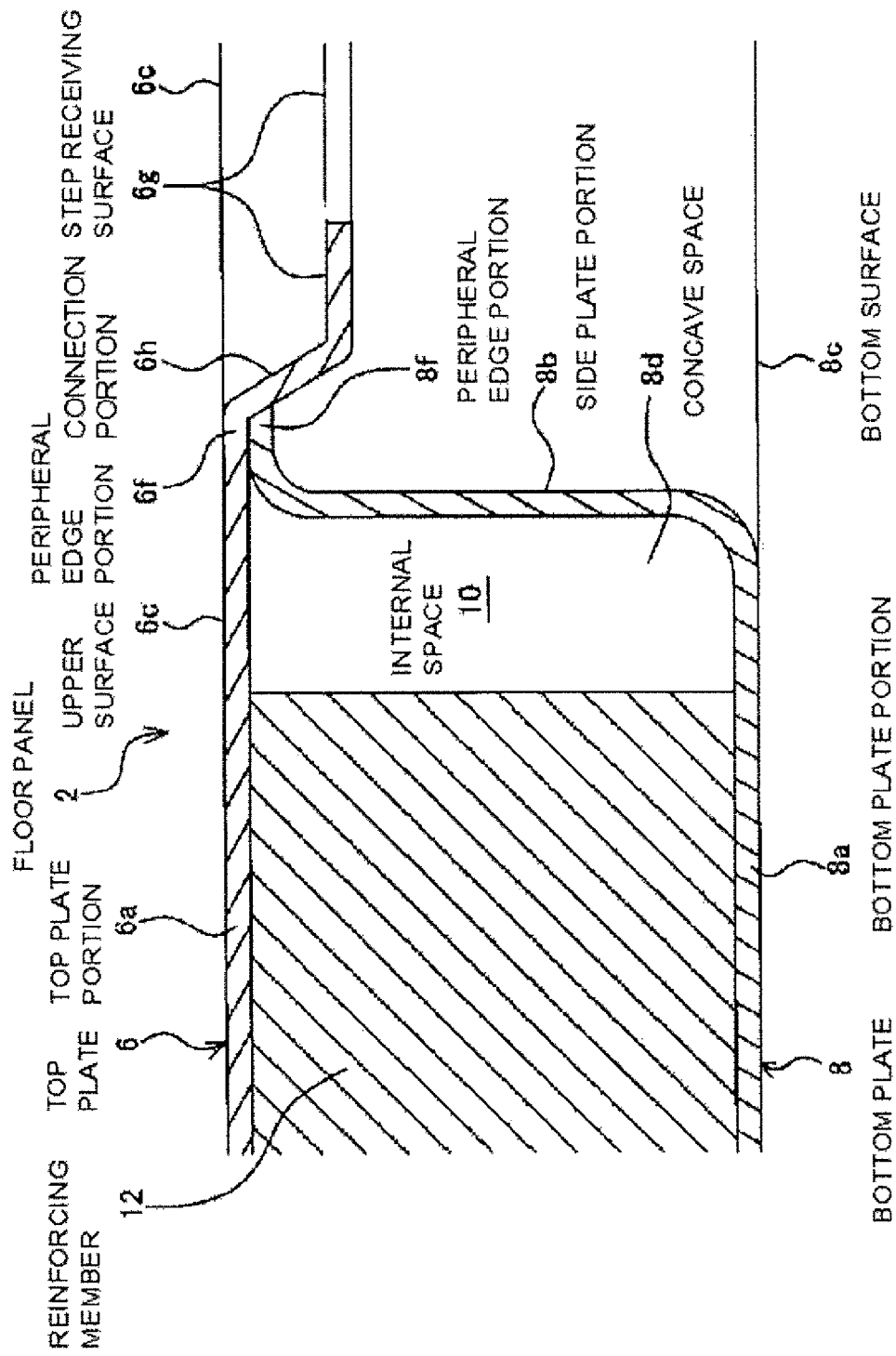
FIG. 14 is a cross sectional view of the floor panel 2 shown in FIG. 11 as seen from an arrow E-E.
Figure 15:
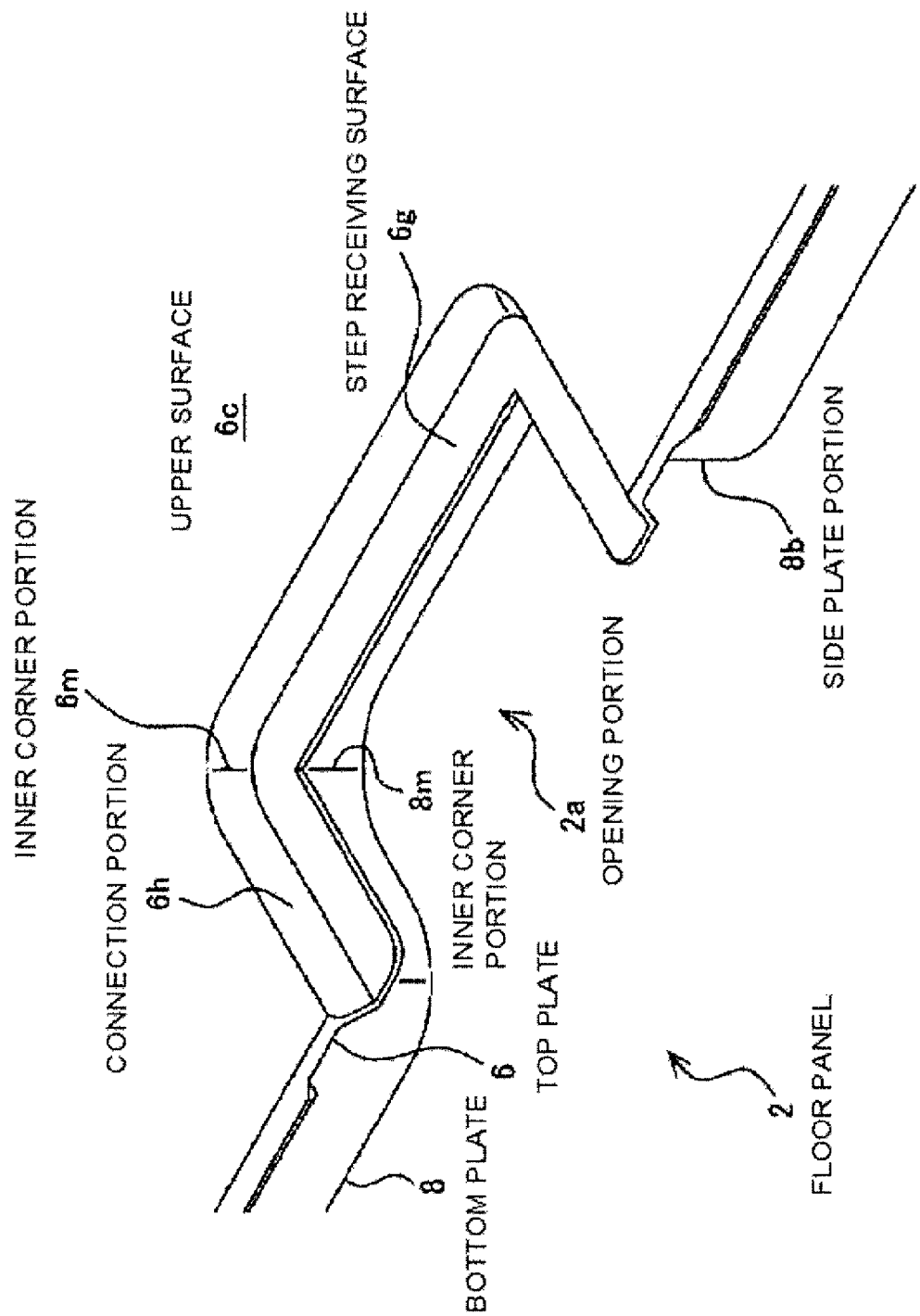
FIG. 15 is a partly enlarged perspective view showing an opening portion 2a of the floor panel 2 shown in FIG. 11 and its periphery in an enlarged manner.

In other words, the inner corner portion 44m in a right side of FIG. 6 in the opening portion 40a of the floor panel 40 is formed as such the curved shape that the horizontal cross sectional shape in the inclined portion 44r intrudes in a rightward direction and an upward direction of the drawing in comparison with the other approximately linear portions than the internal corner portion 44m, as is different from the inner corner portion 6m (refer to FIG. 11) of the opening portion 2a in the conventional floor panel 2.

As a result, a left side of the inner corner portion 44m in the right side of FIG. 6 is formed so as to be curved in a diagonally left downward direction in the drawing at a curved portion 44n in the right side of the drawing and be turned back to the approximately linear portion.

Further, a lower side of the inner corner portion 44m in the right side of FIG. 6 is formed so as to be curved in a diagonally left downward direction of the drawing and be turned back to the approximately linear portion.

Further, the inner corner portion 44m in the left side of FIG. 6 of the opening portion 40a of the floor panel 40 is formed as such the curved shape that the horizontal cross sectional shape in the inclined portion 44r intrudes in a leftward direction and an upward direction of the drawing in comparison with the other approximately linear portions than the internal corner portion 44m, as is different from the inner corner portion 6m (refer to FIG. 11) of the opening portion 2a in the conventional floor panel 2.

As a result, a right side of the inner corner portion 44m in the left side of FIG. 6 is formed so as to be curved in a diagonally right downward direction in the drawing at a curved portion 44n in the left side of the drawing and be turned back to the approximately linear portion.

Further, a lower side of the inner corner portion 44m in the left side of FIG. 6 is formed so as to be curved in a diagonally right downward direction of the drawing and be turned back to the approximately linear portion.

In the same manner, a horizontal cross sectional shape in the inclined portion 46r of the opening portion 40a is also formed as such a curved shape that two inner corner portions (internal corner portions) 46m (refer to FIG. 2) intrude into the inner side of the floor panel 40 in comparison with the other approximately linear portions than the inner corner portions 46m.

As mentioned above, since each of the inner corner portions 44m and 46m is formed as the curved shape so as to intrude into the inner side of the floor panel 40 (an opposite side to the opening portion 40a), a radius of curvature of the inner corner portions 44m and 46m can be made larger than a radius of curvature of the inner corner portions 6m and 8m of the opening portion 2a which is formed without intruding into the inner side of the floor panel 2, such as the conventional floor panel 2.

In other words, the inner corner portions 44m and 46m of the opening portion 40a of the floor panel 40 are respectively formed so as to be gently curved with a larger radius than the inner corner portions 6m and 8m of the opening portion 2a of the conventional floor panel 2.

As a result, even in the case that the top plate 44 and the bottom plate 46 are formed by the press drawing process while using the steel plate which has the small thickness and is not provided for the drawing process, the steel plate of the inner corner portions 44m and 46m in the opening portion 40a of the floor panel 40 does not generate a crack due to lack of sufficient extension, and it is possible to prevent the crack from being generated in the steel plate.

Therefore, even in the case of using the steel plate which has the small thickness and is not provided for the drawing process, it is possible to easily form the portion corresponding to the opening portion 40a in the top plate 44 and the bottom plate 46. Accordingly, since it is not necessary to make the thickness large or use the steel plate for the drawing process, it is possible to achieve a reduction of a material cost of the floor panel 40 and a weight saving of the floor panel 40.

Further, as shown in FIGS. 4, 5 and 8, the reinforcing member 50 having the thickness is provided in the internal space 48 of the floor panel 40 so as to be sandwiched between the top plate portion 44a of the top plate 44 and the bottom plate portion 46a of the bottom plate 46 and be along the side plate portions 44b and 46b. The reinforcing member 50 employs a particle board which is obtained by breaking a wood into small wood pieces so as to dry, and formed under a high temperature and high pressure while adding an adhesive agent.

Since the floor panel 40 is structured, as shown in FIGS. 5 and 8, such that the reinforcing member 50 is sandwiched between the step receiving surfaces 44e and 44g of the top plate 44 and the bottom plate portion 46a of the bottom plate 46 below them, the floor panel 40 can improve the strength of the step receiving surfaces 44e and 44g and is hard to bend. As a result, in the case that a load is applied from the above of the step receiving surfaces 44e and 44g, it is possible to prevent the step receiving surfaces 44e and 44g from being deformed.

Further, in the lid member 18 (refer to FIG. 10) mounted on the step receiving surface 44g of the top plate 44, since the load applied from the above can be supported by the step receiving surface 44g, it is possible to prevent the lid member 18 from being deformed.

As mentioned above, the protruding portion 44k extending horizontally from the lower end portion of the inclined portion 44r is formed in the top plate 44, and the protruding portion 46k extending in the horizontal direction from the upper end portion of the inclined portion 46r is formed in the bottom plate 46.

As a result, even in the case that the great load is applied from the above of the floor panel 40, the protruding portions 44k and 46k protruding to the outer side in the horizontal direction (the center side of the opening portion 40a) from three edge portions constructing the opening portion 40a serves as a reinforcing rib so as to stand up against the great load. Therefore, it is possible to improve a strength of a whole of the floor panel 40.

Figure 9:
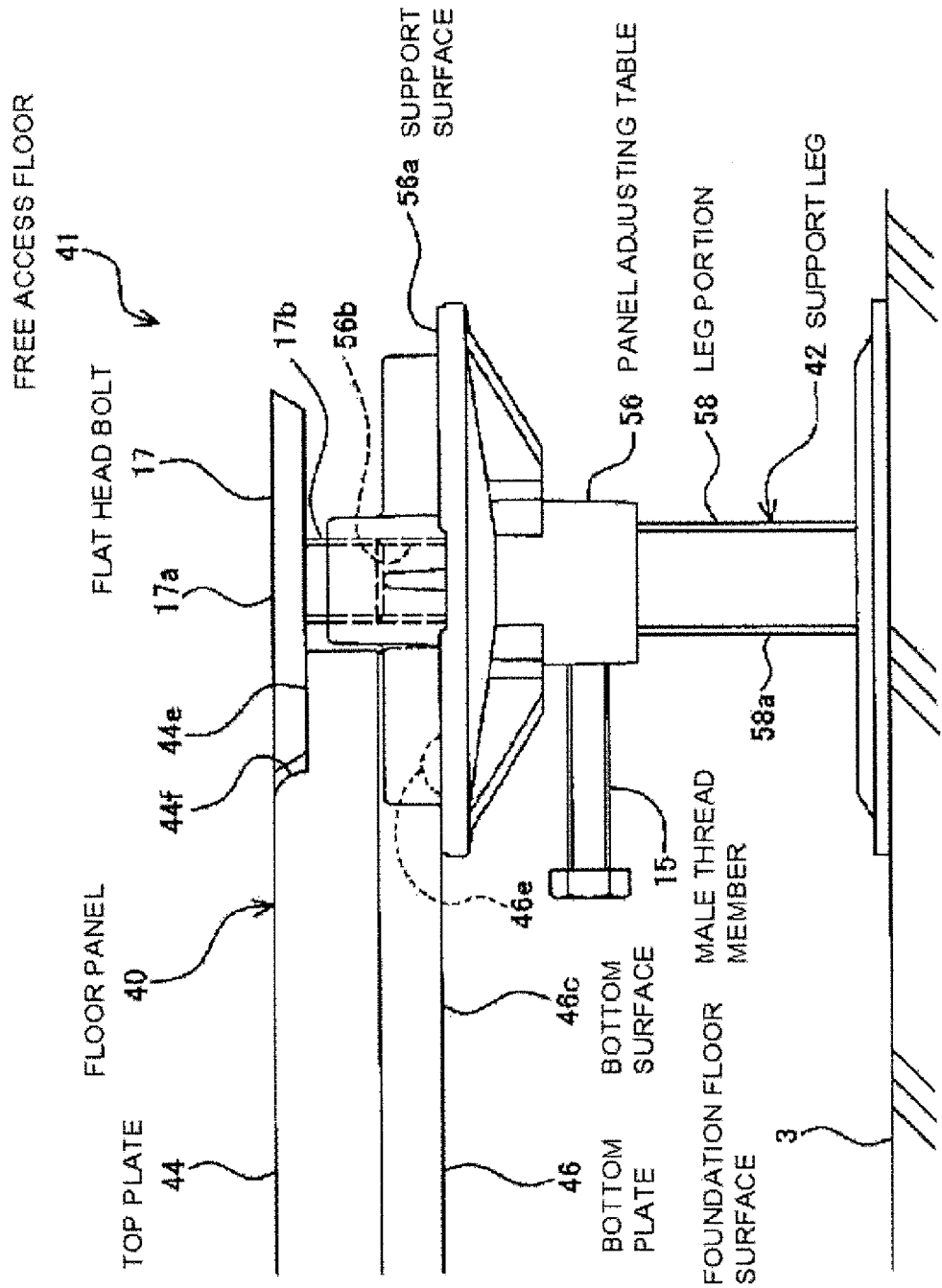
FIG. 9 is a partly side elevational view showing a free access floor 41 which is constructed by the floor panel 40 shown in FIG. 1, and support legs 42 supporting the floor panel 40.

The floor panel 40 is structured, as shown in FIG. 9, such as to construct a free access floor 41 together with support legs 42 which are provided in a rising manner on the foundation floor surface 3. Further, the support leg 42 supporting the floor panel 40 is constructed by a panel adjusting table 56 and a leg portion 58.

The panel adjusting table 56 of the support leg 42 adjusts a height position of the panel adjusting table 56 from the foundation floor surface 3 by relatively rotating the panel adjusting table 56 along a spiral track of a male thread portion 58a in a state in which the male thread portion 58a formed in an outer peripheral portion of the leg portion 58 is threadably joined to a female thread portion formed in a lower end side of an axial portion of the panel adjusting table 56.

Further, the panel adjusting table 56 is fixed to a desired height position from the foundation floor surface 3 by fastening a male thread member 15 to a female thread hole which is formed in a lower end portion of the panel adjusting table 56 and extends its axis in a radial direction.

A plurality of floor panels 40 are mounted on a support surface 56a of the panel adjusting table 56 in such a manner that four corner portions of the bottom surfaces 46c of a plurality of floor panels 40 are gathered to one position and confronted. Further, the step receiving surfaces 44e in four corner portions of the top plate 44 are pressed downward by a flat head portion 17a of a flat head bolt 17, by fastening a male thread portion 17b of the flat head bolt 17 into a female thread hole 56b in an upper end side of an axial portion of the panel adjusting table 56, and the floor panel 40 is fixed onto the support surface 56a of the panel adjusting table 56.

Semispherical concave portions 46e depressed to the upper surface 44c side of the top plate 44 (an upper side direction in FIG. 3) are formed in four corner portions of the bottom surface 46c of the bottom plate 46, as shown in FIG. 2. Further, since the concave portions 46e are fitted to semispherical convex portions provided in the support surface 56a in the case that four corner portions of the bottom surface 46c are mounted onto the support surface 56a of the panel adjusting table 56, the floor panel 40 mounted on the support legs 42 can be easily positioned.

Therefore, as described above, according to the floor panel 40 on the basis of the present embodiment, since the top plate 44 and the bottom plate 46 can be easily formed even in the case of using the steel plate which has the small thickness and is not provided for the drawing process, it is possible to achieve a reduction of a material cost and a weight saving.

The present invention is not limited only to the embodiment mentioned above, but can be variously modified in the floor panel as long as the purpose of the present invention can be achieved.

For example, in the floor panel 40 according to the embodiment mentioned above, the inner corner portions 44m of three approximately C-shaped edge portions of the top plate 44 constructing the opening portion 40a of the floor panel 40 are formed so as to intrude like the curved shape toward the inner side of the floor panel 40 (the opposite side to the opening portion 40a), in FIGS. 6 and 7, however, the shape is not limited to the above shape as long as the horizontal cross section of the inner corner portion of the opening portion 40a of the floor panel 40 is formed so as to have a gentle curve.

Further, in the floor panel 40 according to the embodiment mentioned above, the internal corner portions 46m of three approximately C-shaped edge portions of the bottom plate 46 constructing the opening portion 40a of the floor panel 40 are formed so as to intrude like the curved shape toward the inner side of the floor panel 40 (the opposite side to the opening portion 40a), in FIGS. 2 and 7, however, the shape is not limited to the above shape as long as the horizontal cross section of the inner corner portion of the opening portion 40a of the floor panel 40 is formed so as to have a gentle curve.

Further, in the floor panel 40 according to the embodiment mentioned above, the curved shape (refer to FIGS. 1 and 6) of the inner corner portion 44m of the top plate 44 and the curved shape (refer to FIG. 2) of the inner corner portion 46m of the bottom plate 46 are formed approximately the same shape, however, the horizontal cross sections of the inner corner portions 44m and 46m may be formed as different shapes.

Further, in the floor panel 40 according to the embodiment mentioned above, only one opening portion 40a intruding approximately like the rectangular shape is formed in the side surface thereof, however, a plurality of opening portions 40a intruding approximately like the rectangular shape may be formed in the side edge portion of the floor panel 40.

Further, in the floor panel 40 according to the embodiment mentioned above, the connection portion 44h having the circular arc shaped vertical cross section is formed in three approximately C-shaped edge portions constructing the opening portion 40a of the floor panel 40, however, the connection portion 44h is not limited to the shape mentioned above.

For example, the connection portion 44h may be formed as a vertical plate shape connected so that an approximately perpendicular step is formed between the upper surface 44c and the step receiving surface 44g of the top plate 44, or may be formed as a taper shape connected so that an inclined surface having a fixed angle is formed between the upper surface 44c and the step receiving surface 44g of the top plate 44.

Further, in the floor panel 40 according to the embodiment mentioned above, the connection portion 44f having the circular arc shaped vertical cross section is formed in each of four corner portions of the top plate 44, however, the shape is not limited to the above shape in the same manner as the connection portion 44h mentioned above.

Further, in the floor panel 40 according to the embodiment mentioned above, the top plate 44 is formed as the box shape having the concave space 44d, and the bottom plate 46 is also formed as the box shape having the concave space 46d, however, only the bottom plate 46 may be formed as the box shape having the concave space 46d, and the top plate 44 may be formed approximately as a plate shape, such as the conventional floor panel 2.

Further, in the floor panel 40 according to the embodiment mentioned above, the horizontal cross sectional shape in the inclined portions 44r and 46r of the opening portion 40a is formed as such the curved shape that the inner corner portion 44m (refer to FIGS. 1 and 6) and the inner corner portion 46m (refer to FIG. 2) intrude toward the inner side of the floor panel 40, however, a whole of the horizontal cross section of the opening portion 40a may be formed as the curved shape as mentioned above.

Accordingly, the horizontal cross sectional shape in the connection portion 44h of the opening portion 40a may be formed as such the curved shape that the inner corner portion intrudes toward the inner side of the floor panel 40.

What is claimed is:

1. A floor panel comprising an upper member and a lower member which are formed as opened box shape having a concave space,
    wherein the peripheral edge portions are connected so as to communicate the concave spaces in said upper member and said lower member with each other, and an internal space is formed in the inner portion thereof,
    wherein a notched portion intruding approximately as a rectangular shape with two inner corners which extend into an inner side of said floor panel is formed in a peripheral edge and side plate portion of each of said upper member and said lower member,
    wherein a step receiving surface having a step in relation to the upper surface of the floor panel is formed in said upper member so as to be along three edge portions of said notched portion,
    wherein the two internal corner portions of said rectangular notched portion formed in the upper member intrude into the inner side of said floor panel, in a horizontal cross section below the step receiving surface, and
    wherein the two internal corner portions of said rectangular notched portion formed in the lower member intrude into the inner side of said floor panel, in a horizontal cross section above a bottom surface of the floor panel.

2. The floor panel according to claim 1, wherein the peripheral edge of the rectangular shaped notched portion formed when the upper and lower members are joined together, and
    wherein a lower surface of the protruding portion in said upper member and an upper surface of the protruding portion in said lower member are joined to each other.

3. The floor panel according to claim 1, wherein a reinforcing member is provided in said internal space which is formed between said upper member and said lower member.

4. The floor panel according to claim 2, wherein a reinforcing member is provided in said internal space which is formed between said upper member and said lower member.

5. The floor panel according to claim 1, wherein the two internal corner portions of said rectangular notched portion formed in the upper member is configured to intrude into the inner side of said floor panel, in a horizontal cross section below the step receiving surface, and a center portion between the two internal corner portions is configured to protrude toward an outer side of said floor panel, and
    wherein the two internal corner portions of said rectangular notched portion formed in the lower member is configured to intrude into the inner side of said floor panel, and a center portion between the two internal corner portions is configured to protrude toward an outer side of said floor pane, in a horizontal cross section above a bottom surface of the floor panel.

6. The floor panel according to claim 5, wherein portions protruding in a horizontal direction three edge portions of said rectangular shaped notched portion, in contact portions between a lower surface of said upper member and an upper surface of said lower member, are formed in said notched portions of said upper member and said lower member, and
    wherein a lower surface of the protruding portion in said upper member and an upper surface of the protruding portion in said lower member are joined to each other.

7. The floor panel according to claim 5, wherein a reinforcing member is provided in said internal space which is formed between said upper member and said lower member.

8. The floor panel according to claim 6, wherein a reinforcing member is provided in said internal space which is formed between said upper member and said lower member.

* * * * *